(No Model.)
W. McCONWAY.
CAR COUPLING.
No. 447,969. Patented Mar. 10, 1891.
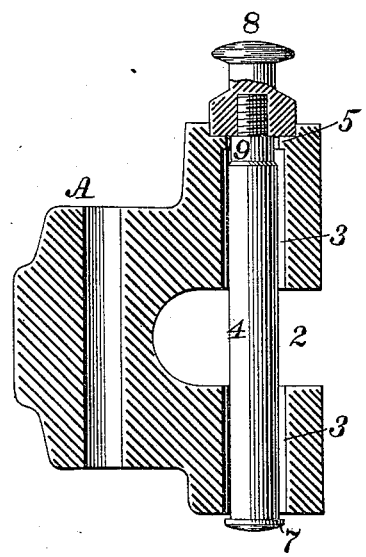
WITNESSES:
Darwin L. Wolcott
F. E. Gaither
INVENTOR,
William McConway
by George H. Christy
Att'y.

UNITED STATES PATENT OFFICE.

WILLIAM McCONWAY, OF PITTSBURG, PENNSYLVANIA.

CAR-COUPLING.

SPECIFICATION forming part of Letters Patent No. 447,969, dated March 10, 1891.

Application filed November 25, 1890. Serial No. 372,583. (No model.)

*To all whom it may concern:*

Be it known that I, WILLIAM MCCONWAY, a citizen of the United States, residing at Pittsburg, in the county of Allegheny and State of Pennsylvania, have invented or discovered certain new and useful Improvements in Car-Couplers, of which improvements the following is a specification.

The invention described herein relates to certain improvements in swinging-hook couplers of the Janney type. The swinging hooks of this type of coupler are formed with a horizontal slot and a circular opening transverse of said slot for the reception of the link and pin of the ordinary coupler. The pins ordinarily employed vary considerably in length, so that it frequently happens that the lower end of the pin extends only a short distance into the jaw of the coupler below the slot. A like defect as regards the fitting of the pin may result from a bend in the latter, preventing a proper insertion of the pin in the vertical hole in the hook. When a heavy pull is exerted upon such imperfectly-fitting pins, a portion of the lower jaw of the hook is broken out, and this injury to the lower jaw is followed by a like injury to the upper jaw. These injuries may be prevented by the employment of a pin of sufficient length and size to have a bearing for the entire length of the vertical hole; and to this end the present invention consists in so constructing a pin and coupler that the former cannot be removed from the latter.

In the accompanying drawing, forming a part of this specification, is shown a sectional elevation of the hook of a Janney coupler having the coupling-pin locked therein.

In the practice of my invention the hook A is of the usual or any suitable construction, and is formed with the horizontal slot 2 for the reception of the link, and with the vertical hole 3 transverse of the slot for the coupling-pin 4. At the upper end of the hole is formed a small inwardly-projecting rib 5. The pin, which is preferably of steel, is made of such a diameter that it will pass freely through the hole 3 at the rib 5—that is, the diameter of the pin is smaller than the diameter of the hole by an amount equal to twice the projection of the rib. On the lower end of the pin is formed a bead or enlargement 7 of a diameter to pass freely through the hole 3, but will engage the rib 5, thereby preventing the removal of the pin from the hook. On the upper end of the pin, after it has been passed through the hole 3, is secured a head 8, which prevents the pin from dropping out. This head may be screwed on the pin or otherwise secured thereto. The pin is grooved at a point in line with the rib 5, said groove 9 being made of a depth equal to the projection of the rib, so that the pin may have a full and equal bearing along the jaws of the hook, and that the pin may not be cut by the rib or the latter worn away by the pin.

It will be observed that the coupling-pin is so constructed that while it cannot be removed from the coupler it is free to rotate therein, thereby preventing a constant wear and strain on one side of the pin. Such constant strain and wear would soon render the pin weak, or by bending render it unfit for further use.

I claim herein as my invention—

1. In a coupler, a hook provided with a horizontal slot and a vertical hole transverse of the slot, and an inwardly-projecting rib at the upper end of the hole, in combination with a headed pin fitting in said hole and provided at its lower end with an enlargement constructed to engage said rib and prevent the removal of the pin from the hook while permitting the free rotation of the pin, the pin and the walls of the vertical hole being so constructed that the pin shall bear against the side of the hole along its entire length, substantially as set forth.

2. In a coupler, a hook provided with a horizontal slot and a vertical hole transverse of the slot, and an inwardly-projecting rib at the upper end of the hole, in combination with a headed pin fitting in said hole and provided at its lower end with an enlargement constructed to engage said rib, the pin being grooved at a point in line with the rib when the pin is in normal position, substantially as set forth.

In testimony whereof I have hereunto set my hand.

WILLIAM McCONWAY.

Witnesses:
DARWIN S. WOLCOTT,
J. SNOWDEN BELL.